Figure 1:
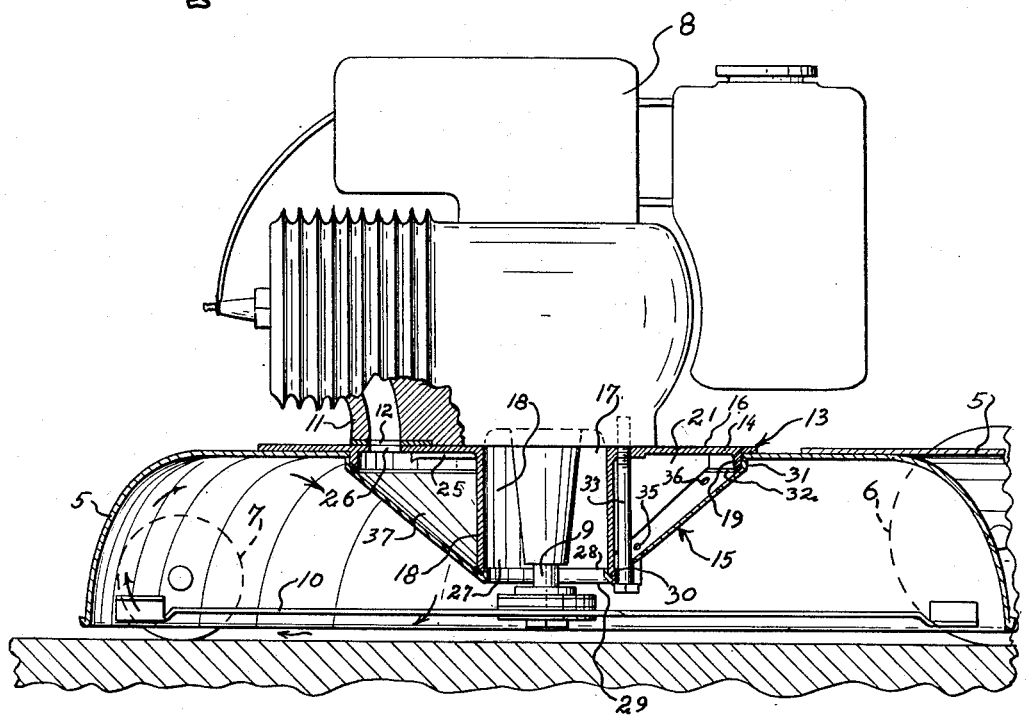

April 20, 1954  H. E. KROLL  2,675,662
INTERNAL-COMBUSTION ENGINE MUFFLER FOR LAWN MOWERS
Filed July 21, 1952

INVENTOR
HARLEY E. KROLL
BY Williamson, Williamson
Schroeder & Adams ATTORNEYS

Patented Apr. 20, 1954

2,675,662

UNITED STATES PATENT OFFICE 2,675,662

INTERNAL-COMBUSTION ENGINE MUFFLER FOR LAWN MOWERS

Harley E. Kroll, Minneapolis, Minn., assignor to Toro Manufacturing Corporation of Minnesota, Minneapolis, Minn., a corporation of Minnesota Application July 21, 1952, Serial No. 300,098

12 Claims. (Cl. 56—25.4)

This invention relates to internal combustion engines. More particularly, it relates to a combined support plate and muffler for an internal combustion engine to be utilized when it is necessary to support such an engine upon the frame of a machine.

On many machines it is necessary to mount an internal combustion engine thereupon to provide a source of power for some operation conducted by or in conjunction with the machine. Since the engine itself is necessarily often times quite heavy, it becomes imperative to keep the weight of the rest of the machine at a minimum. This presents a problem, however, since the supporting plate must be sufficiently strong to support the engine. In certain instances, such as in the case of a lawn mower utilizing a cutter unit rotating about a vertical shaft, this problem is amplified because most of the weight of the machine is concentrated closely adjacent to the shaft. Another problem presented by the use of such an engine is the large volume of noise normally occasioned by the use of the same as a result of the internal explosions which take place therewithin. Many mufflers have been designed in the past for such engines with the idea of eliminating or substantially reducing such annoying and nerve-racking explosions. Some of these have intricate structures. Those which are simple have not been too effective since the usual principle employed is the building up of a back pressure within an enclosure which serves to muffle the report of the explosion. Such back pressures, however, hinder the efficient operation of the engine. My invention is directed toward the simultaneous solving of these problems through a simple and inexpensive structure positioned beneath the engine and supporting the same.

It is a general object of my invention to provide a combined support plate and muffler for an internal combustion engine.

A more specific object is to provide a housing constructed to support a relatively heavy internal combustion engine and at the same time receive the exhaust gases from the engine therewithin to effectively muffle the same, the entire construction being such as to be very light in weight.

Another object is to provide a combined support plate and muffler for an internal combustion engine upon a lawn mower of the type utilizing a rotary cutter unit mounted for rotation on a vertical shaft, the combined plate and muffler being constructed to muffle the exhaust discharge noises in a more effective manner.

Another object is to provide a combined support plate and muffler for an internal combustion engine mounted upon a rotary mower which will utilize the cut and uncut grass to increase the deadening effect of the muffler.

Another object is to provide a combined support plate and muffler for an internal combustion engine upon a rotary mower, the support plate and muffler being strategically positioned to cause the discharge flow from the muffler to supplement the convective currents set up by the rotary cutter unit of the mower and utilizing these convective currents to increase the efficiency of the mower.

Another object is to provide a combined support plate and muffler for an internal combustion engine which consists of a housing having internal cross members which will serve a dual purpose of strengthening the support plate and sectionalizing the interior of the housing to increase the muffling effect on the exhaust discharge noises.

Another object is to provide a housing constituting a combined support plate and muffler for an internal combustion engine, the housing being sectionalized into a single intake chamber and a plurality of communicating outlet chambers by a plurality of vertically extending webs, these webs simultaneously functioning to strengthen the upper portion of the housing which function as the support plate for the engine.

These and other objects and advantages of my invention will more fully appear from the following description made in connection with the accompanying drawings, wherein like reference characters refer to the same or similar parts throughout the several views, and in which—

Figure 2:
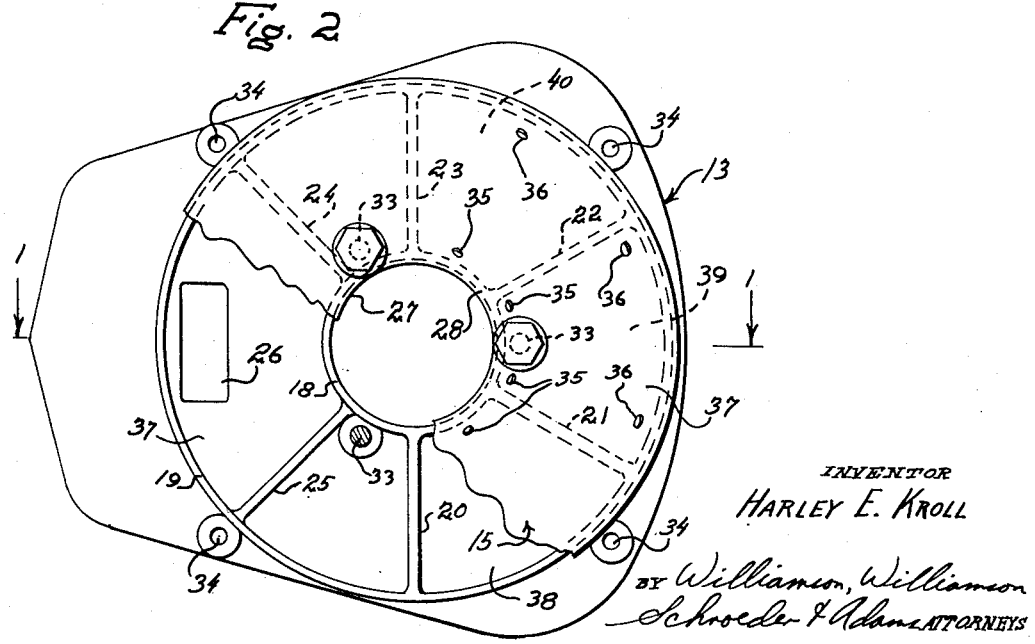

Fig. 1 is a side elevational view of the mowing apparatus of a lawn mower having a rotary cutter unit mounted on a vertical shaft, this lawn mower being equipped with one embodiment of my invention and the lower portion of which is shown in vertical section; and Fig. 2 is a bottom plan view of one embodiment of my invention on an enlarged scale with part of the lower portion thereof cut away to show the interior thereof.

One embodiment of my invention is shown in Fig. 1 being utilized in conjunction with a rotary type lawn mower having a framework 5 made ambulant by front wheels 6 and rear wheels 7. As shown, the mower includes an internal combustion engine 8 which is carried by the frame 5 and which has a depending vertical drive shaft 9. A rotary cutter unit 10 is carried by the lower end of the drive shaft 9 and is rotated thereby at high speeds. The engine 8 also includes an exhaust manifold 11, the port 12 of which opens downwardly.

The embodiment shown in Figs. 1 and 2 consists of a housing indicated generally as 13, this housing constituting a combined support plate and muffler for the motor 8 and having an upper portion designated by the numeral 14 and a lower portion designated by the numeral 15. As best shown in Fig. 1, the upper portion 14 is generally horizontal and has a flat upper surface 16 adapted to receive and support the engine 8. This horizontal upper portion 14 has a central opening 17 adapted to receive therethrough the drive shaft 9. A rigid tubular element such as the sleeve 18 extends downwardly from the generally horizontal upper portion 14. As best shown in Fig. 1 this sleeve 18 is open at both ends.

Depending from the peripheral area of the upper portion 14 of the housing is an annular rigid flange 19 and extending between this flange and the sleeve 18 is a plurality of webs 20, 21, 22 and 23. These webs are continuous from the lower edge of the flange 19 to the lower end of the sleeve 18 and serve to sectionalize the interior of the enclosure formed by the upper portion 14 and the lower portion 15 of the housing. A pair of strengthening ribs 24 and 25 also depend from the upper portion 14 and extend between the annular flange 19 and the tubular sleeve 18. These ribs 24 and 25, however, extend only a short distance below the generally horizontal portion 14, as best shown in Fig. 1. Adjacent the forward area of the horizontal portion 14 is an opening 26 which is adapted to communicate with the exhaust manifold 11 so as to receive the exhaust gasses of the engine 8 therethrough and into the interior of the enclosure formed by the housing 13.

The lower portion 15 is comprised of a generally frusto-conically shaped shell which is complementary in shape with respect to the upper portion 14 and forms a hollow enclosure therewith. This shell 15 has a central opening 27 at its bottom and the material defining that opening is bent inwardly and upwardly as at 28 to engage and receive the lower end of the sleeve 18 in the channel formed thereby. By bending this material inwardly and upwardly an annular flange 29 is formed within which is seated a gasket 30 which makes the connection between the lower portion 14 and the sleeve 18 fluid tight to prevent the escape of any substantial amount of exhaust gases. The lower portion 14 also has an inturned circumferential flange 31 which is adapted to receive therewithin the annular flange 19 and to seat a gasket 32 to insure a fluid tight connection between the lower portion 15 and the flange 19. The lower portion 15 and the upper portion 14 are secured together and are secured to the engine 8 by means of bolts 33 which extend upwardly through both portions and into the engine 8 as best shown in Fig. 1.

The entire housing 13 and the engine 8 are secured to the frame 5 of the lawn mower by bolts through openings 34 provided for that purpose in the peripheral area of the upper horizontal portion 14.

The lower portion 15 is provided with a plurality of discharge apertures 35 which are positioned closely adjacent to the lower end thereof and to the flange 29 but immediately outside the wall of the sleeve 18. These discharge apertures are so positioned that any condensation of water vapor which takes place within the enclosure may readily drain from the interior thereof. A plurality of other discharge apertures 36 are provided adjacent the upper area of the lower portion 15 and adjacent to the annular flange 19. Each of these discharge apertures are approximately ⅛ inch in diameter and their number is coordinate with the amount of back pressure which can be successfully utilized with the particular engine 8 without having deleterious effects upon its operation.

It should be noted that the webs 20, 21, 22 and 23 extend downwardly to a position in close but spaced proximity to the lower portion 15. In effect, the two webs 20 and 23 divide the enclosure into an intake chamber 37 and a plurality of outlet chambers 38, 39 and 40. These outlet chambers, however, all communicate with each other and communicate with the intake chamber 37. The communication, however, is restricted so that the main effects of the explosion is absorbed in the intake chamber 37 and the remainder of the explosion is transmitted through the restricted openings to the various outlet chambers 38, 39 and 40. Because of the substantially closed nature of these outlet chambers, much of the sound is absorbed within these chambers because of their unique construction.

In use, the upper portion 14 is secured to the frame 5 by means of bolts through the openings 34. The engine 8 and the lower portion 15 of the housing 13 is secured to the upper portion 14 by means of the bolt 33. The drive shaft 9 extends through the opening 27 of the housing and drives the rotary cutter unit 10 which sets up convective currents beneath the housing of the mower in the manner indicated by the arrows in Fig. 1.

The exhaust discharges of the engine 8 are conveyed into the interior of the housing 13 by way of the exhaust manifold 11 and the opening 26. Substantially all of the sound is absorbed either in the intake chamber or in the three outlet chambers 38, 39 and 40. A slight back pressure is built up within the enclosure and as indicated above, this back pressure may be regulated by varying the number of discharge passages until a steady stream of discharge gases is attained. Because of the close proximity of the discharge apertures to the ground and to the grass, both cut and uncut, the muffling effect produced by the housing 13 is supplemented to such an extent that an operator of the mower may converse with another at normal tones while standing beside the mower with the engine running.

The convective currents set up by the rotary cutter unit 10 serve to aid in permitting the free discharge of the exhaust gases from the interior of the enclosure of the housing 13. Simultaneously, the steady stream of discharge passing through the discharge apertures 35 and 36 serves to supplement and maintain the convective currents set up by the rotary cutter unit 10, as can readily be seen by reference to Fig. 1.

It should be noted that the webs 20, 21, 22 and 23 have a combined function. These webs serve to distribute the weight of the engine away from the shaft 9 to the more remote lateral areas of the generally horizontal portion 14. Since their inner ends bear against the outer walls of the sleeve 18 and the outer ends against the annular flange 19, sufficient distribution of the weight is accomplished to enable the entire housing 13 to be made of a very light weight metal. In addition to distributing the weight evenly and thus permitting the housing 13 to be formed of a light weight metal, the webs 20, 21, 22 and 23 serve to sectionalize the interior of the housing to increase the muffling effect on the exhaust discharge explosions. At the same time, the webs 20 and 23 serve to divide the interior of the housing into a single intake chamber and a plurality of communicating discharge chambers.

Some of the advantages of my combined support plate and muffler for an internal combustion engine, are that a better muffling effect is attained and that the entire structure may be constructed with a minimum of materials and expense. It can be readily seen that I have provided a simple structure which not only provides an adequate support plate for the mower but at the same time utilizes a portion of such structure to provide an improved muffler for the engine. In addition, this structure serves to supplement the convective currents set up by the rotary cutter unit of the mower.

It should be noted that the frusto-conical shape of the lower portion 15 of the housing 13 prevents the formation of mats of comminuted grass which would normally accumulate around any strengthening structure provided for a support plate beneath the engine 8. Such matted comminuted grass provides a frictional retardation against forward movement of the mower and hence would require considerable more power to operate the mower under such conditions. In addition, the muffler of my invention is so relatively inaccessible as to guard against possible danger of burning the operator or children who may approach the machine while it is not being operated.

It will, of course, be understood that various changes may be made in the form, details, arrangement and proportions of the various parts without departing from the scope of my invention.

What is claimed is:

1. A combined support plate and muffler for an internal combustion engine comprising, a housing having a generally horizontal upper portion with an intake opening formed therethrough to permit the exhaust gases of such an engine to be conveyed into the interior of said housing, said horizontal upper portion having an upper and exterior surface adapted to receive and support such an engine thereupon, said housing having a lower portion complementary in shape to said upper portion and forming a substantially closed and hollow enclosure therewith, said lower portion having a plurality of relatively minute discharge passages formed therethrough and bringing the interior of said enclosure in communication with the exterior, one of said portions having a rigid tubular element extending through the central area of said enclosure to the other of said portions and adapted to receive the drive shaft of such an engine therethrough, and the other of said portions having an opening formed therein with the material defining said last mentioned opening being adapted to receive and engage said tubular element and cooperate therewith to form a substantially fluid tight connection therebetween with the drive shaft extending therethrough.

2. A combined support plate and muffler for an internal combustion engine comprising, a housing having a generally horizontal upper portion with an intake opening formed therethrough to permit the exhaust gases of such an engine to be conveyed into the interior of said housing, said horizontal upper portion having an upper and exterior surface adapted to receive and support such an engine thereupon, said housing having a lower portion complementary in shape to said upper portion and forming a substantially closed and hollow enclosure therewith, said lower portion having a plurality of relatively minute discharge passages formed therethrough and bringing the interior of said enclosure in communication with the exterior, one of said portions having a rigid tubular element extending between said portions and through the central portion of said housing and adapted to receive the drive shaft of such an engine therein to permit such shaft to extend through said housing in piercing relation, and the other of said portions having an opening to accommodate such shaft and cooperate with said tubular element to prevent the escape of exhaust gases through said last mentioned opening.

3. The structure defined in claim 2, said upper portion of said housing having a plurality of spaced radially extending webs extending downwardly toward said lower portion to a position in spaced but close proximity to said lower portion, said webs providing bracing structure for said upper portion to aid in supporting such an engine and functioning to sectionalize the interior of said housing into a plurality of communicating sound-absorbing compartments.

4. A combined support plate and muffler for an internal combustion engine comprising a housing having a generally horizontal upper portion with an intake opening formed therethrough to permit the exhaust gases of such an engine to be conveyed into the interior of said housing, said horizontal upper portion having an upper and exterior surface adapted to receive and support such an engine thereupon, said housing having a generally frusto-conically shaped lower portion forming a substantially hollow enclosure therewith, said lower portion having a plurality of relatively minute discharge passages formed therethrough and bringing the interior of said enclosure in communication with the exterior, one of said portions having a rigid tubular element disposed centrally thereof and extending vertically between said portions with substantially fluid tight connections therewith and adapted to receive the drive shaft of such an engine therethrough to permit such shaft to extend through said housing in piercing relation, said horizontal upper portion having a plurality of radially extending webs depending therefrom to a position in spaced but close proximity to said lower portion and extending from said tubular member to the peripheral area of said upper portion, said webs providing bracing structure for said upper portion to aid in supporting such an engine and simultaneously functioning to sectionalize the interior of said housing into a plurality of communicating and sound absorbing compartments.

5. A combined support plate and muffler having an internal combustion engine comprising a housing having a generally horizontal upper portion with an intake opening formed therethrough to permit the exhaust gases of such an engine to be conveyed into the interior of said housing, said horizontal upper portion having an upper and exterior surface adapted to receive and support such an engine thereupon, said housing having a lower portion comprised of a generally frustoconically shaped shell open at each end and complementary in shape to said upper portion and forming a substantially hollow enclosure therewith, said lower portion having a plurality of relatively minute discharge passages formed therethrough and bringing the interior of said enclosure in combination with the exterior, said upper portion having a rigid tubular element extending downwardly from its central portion toward said lower portion and adapted to receive the drive shaft of such an engine therethrough, said upper portion having a plurality of rigid webs extending downwardly therefrom and from the outer walls of said tubular element to the peripheral area of said upper portion and to a position in spaced but close proximity to said lower portion, said webs providing bracing structure for said upper portion to aid in supporting such an engine and functioning to sectionalize the interior of said housing into a plurality of communicating sound-absorbing compartments.

6. A combined support plate and muffler for an internal combustion engine comprising, a housing having a generally horizontal upper portion with an intake opening formed therethrough to permit the exhaust gases of such an engine to be conveyed into the interior of said housing, said horizontal upper portion having an upper and exterior surface adapted to receive and support such an engine thereupon, said upper portion having an annular flange depending from its peripheral area and having an open ended sleeve extending downwardly through the remainder of said housing to receive the drive shaft of such an engine therethrough and having a plurality of circumferentially spaced depending rigid webs extending between said sleeve and said flange, said housing having a lower portion complementary in shape to said upper portion and forming a substantially hollow enclosure therewith, said lower portion having a plurality of relatively minute discharge passages formed therethrough and bringing the interior of said enclosure in communication with the exterior, said lower portion having an opening formed centrally therethrough with the material defining said last mentioned opening being adapted to cooperate with said sleeve to form therewith a substantially fluid tight connection.

7. The structure defined in claim 6, said lower portion having a generally frusto-conical external shape whereby accumulations of foreign material are prevented from forming and clinging onto said lower portion.

8. A lawn mower having in combination a mower frame, an internal combustion engine having an exhaust manifold and a vertically depending drive shaft, a rotary cutter unit mounted on the lower end of said drive shaft and forming convective currents of air directed downwardly adjacent said drive shaft, and a combined support plate and muffler mounted on said frame and supporting said engine, said support plate and muffler comprising a housing having a generally horizontal upper portion with an intake opening formed therethrough connected to the exhaust manifold of said engine to convey the exhaust gases of said engine into the interior of said housing, said engine being superimposed upon said upper portion and supported thereby with its drive shaft extending downwardly through the central portion thereof, said upper portion having a depending annular flange at its peripheral area and a sleeve surrounding the drive shaft of said motor and extending downwardly therefrom and having a plurality of rigid webs connecting the outer side walls of said sleeve to said flange, said housing having a lower portion of lesser diameter than the diameter of the orbit of said rotary cutter unit and being complementary in shape to said upper portion and forming a substantially hollow enclosure therewith, said lower portion having a plurality of relatively minute discharge passages formed therethrough and bringing the interior of said enclosure in communication with the exterior, said lower portion being disposed directly above the central portion of said rotary cutter unit whereby the stream of exhaust gases emitted through said passages supplements the convective currents created by said cutter unit, said webs extending to a position in spaced but close proximity to said lower portion and providing bracing structure for said upper portion to aid in supporting said engine and functioning to sectionalize the interior of said housing into a plurality of communicating sound-absorbing compartments.

9. A combined support plate and muffler for an internal combustion engine comprising a housing having a generally horizontal upper portion with an intake opening formed therethrough to permit the exhaust gases of such an engine to be conveyed into the interior of said housing, said horizontal upper portion having an upper and exterior surface adapted to receive and support such an engine thereupon, said upper portion having an annular flange depending from its peripheral area and having an open ended sleeve extending downwardly through substantially the remainder of said housing to receive the drive shaft of such an engine therethrough and having a plurality of circumferentially spaced depending rigid webs extending between said sleeve and said flange, said housing having a lower portion complementary in shape to said upper portion and forming a substantially hollow enclosure therewith, said lower portion having a plurality of relatively minute discharge passages formed therethrough and bringing the interior of said enclosure in communication with the exterior, said lower portion having an opening formed centrally therethrough with the material defining said last mentioned opening being adapted to cooperate with said sleeve to form therewith a substantially fluid tight connection, some of said webs serving to divide the interior of said housing into a sectional intake chamber and a plurality of communicating outlet chambers, said discharge passages being formed through the material of said lower portion which with said webs forms said outlet chambers.

10. A combined support plate and muffler for an internal combustion engine comprising, a housing having a generally horizontal upper portion with an intake opening formed therethrough to permit the exhaust gases of such an engine to be conveyed into the interior of said housing, said horizontal upper portion having an upper and exterior surface adapted to receive and support such an engine thereupon, said housing having a lower portion forming and defining in cooperation with said upper portion a substantially closed and substantially hollow enclosure constituting the interior of said housing, said lower portion having a plurality of relatively minute discharge passages formed therethrough and bringing the interior of said enclosure in communication with the exterior, portions of said hollow housing defining an opening extending vertically through the central portions of said housing, said opening defining portions of said housing being adapted to receive the drive shaft of such an engine therethrough in snug-fitting relation, the portions of said housing defining said opening forming a substantially fluid-tight connection with the remaining portions of said housing, said enclosure defining portions of said housing constituting a muffler for such an engine.

11. A combined support plate and muffler for an internal combustion engine comprising, a hollow and substantially closed housing having a generally horizontal upper portion with an intake opening formed therethrough to permit the exhaust gases of such an engine to be conveyed into the hollow interior of said housing, said horizontal upper portion having an upper and exterior surface adapted to receive and support such an engine thereupon and having a plurality of circumferentially spaced depending rigid webs extending downwardly from said upper portion, said housing having a lower portion complementary in shape to said upper portion and forming and defining a substantially closed and substantially hollow enclosure therewith, said lower portion having a plurality of relatively minute discharge passages formed therethrough bringing the interior of said enclosure into communication with the exterior, said lower and upper portions having a vertically extending opening formed centrally therethrough adapting the same to receive the drive shaft of such an engine therethrough in close-fitting relation with the opening defining portions of said housing, said hollow housing constituting a muffler for such an engine.

12. A lawn mower having in combination a mower frame, an internal combustion engine having an exhaust manifold and a vertically depending drive shaft, a rotary cutter unit mounted on the lower end of said drive shaft and forming in conjunction with said mower frame convective currents of air directed downwardly adjacent said drive shaft, a support plate mounted on said frame and supporting said engine, a frusto-conically shaped shell secured to said support plate and extending downwardly therefrom and forming a hollow and substantially closed housing therewith, said support plate having a generally horizontal upper surface and having an intake opening formed therethrough connected to the exhaust manifold of said engine to convey the exhaust gases of said engine into the interior of said housing, said engine being superimposed upon said support plate and supported thereby with its drive shaft extending downwardly through the central portion of said support plate and of said shell, said shell having a lesser diameter than the diameter of the orbit of said rotary cutter unit and having a plurality of relatively minute discharge passages formed therethrough bringing the interior of said enclosures in communication with the exterior, said shell being disposed directly above the central portion of said rotary cutter unit whereby the stream of exhaust gases emitted through said passages supplements the convective currents created by said cutter unit.

References Cited in the file of this patent

UNITED STATES PATENTS

| Number | Name | Date |
|---|---|---|
| 2,504,416 | Hileman | Apr. 18, 1950 |
| 2,531,081 | Shippey | Nov. 21, 1950 |